Nov. 16, 1965     J. D. AINSWORTH     3,218,541
POLYPHASE ELECTRICAL CONVERTER EQUIPMENT
Filed March 1, 1961     5 Sheets-Sheet 1

United States Patent Office 3,218,541
Patented Nov. 16, 1965

3,218,541
POLYPHASE ELECTRICAL CONVERTER
EQUIPMENT
John Desmond Ainsworth, Stafford, England, assignor to
The English Electric Company, Limited, Strand, London, England, a British company
Filed Mar. 1, 1961, Ser. No. 92,619
Claims priority, application Great Britain, Mar. 22, 1960, 10,093/60
17 Claims. (Cl. 321—38)

This invention relates to electrical converter equipment, suitable for use for instance in high voltage direct current transmission systems, which are capable of electrical power transmission at levels of the order, for instance, of 500 kv., 1000 A. Such systems are contemplated for the transmission of power from A.C. generating equipment, and the equipment for transmitting the generated power to line is polyphase rectifier or inverter equipment.

Such equipment has not been economically possible until recently because of the high cost of the switching equipment required. However, modern switching techniques have now made it practicable to utilise the technical advantage of D.C. transmission, such as the use of two-wire transmission lines, instead of three-wire transmission lines.

The equipment used may be of the half-wave type, or of the bridge type, of which the latter has better transmission qualities.

However, half-wave three-phase equipment is easier to switch. This is because only one set of three mercury-arc valves is required for handling the two-wire transmission circuit, the other leg being electrically continuous.

For this reason, the operation of any one of the three valves completes the D.C. current and there is no difficulty in switching in response to short switching pulses applied to control grids in the mercury-arc valves.

In the case of bridge rectifier equipment each leg of the D.C. transmission circuit includes three paralleled valves, so that it will be seen that when all six valves are open-circuited, the operation of one valve in one leg does not complete the D.C. transmission path, and more difficult switching problems arise then in the case of half-wave equipment.

It has already been proposed to overcome this problem by utilising broad 120° pulses for grid switching, but the switching problem involved presents difficulties.

It is the object of the present invention to provide improved means for the switching of bridge converter equipment in high voltage D.C. transmission equipment.

One aspect of the invention comprises grid-controlled mercury-arc polyphase electrical converter equipment including a high speed bistable trigger circuit individual to each mercury-arc valve grid, and a source of low-power electrical control pulses controlling the operation of said trigger circuits in the required time cycle for operation of the converter as a rectifier or an inverter.

Another aspect of the invention comprises polyphase electrical converter equipment comprising plurality of semi-conductor controlled or gated diodes, comprising a high-speed bi-stable trigger circuit individual to each diode control, and a source of low-power electrical control pulses controlling the operation of said trigger circuits in the required time cycle for operation of the converter as a rectifier or an inverter.

The term "polyphase" is to be understood to include, for the purposes of the present specification and claims, single-phase bi-phase and single-phase bridge converter equipment, which are really 2-phase and have A.C. vectors at 360/2 equals 180°.

For this purpose, so-called flip-flop trigger circuits are used, each of which comprises two gated silicon semi-conductor devices, or two small mercury-arc valves, and has two stable conditions of equilibrium in one of which one of the devices is conducting and the other is non-conducting, while in the other state of equilibrium the roles of the two devices are reversed.

The invention will be described with reference to embodiments shown in the accompanying drawings in which:

FIG. 8 shows an alternative switching circuit, while

Figure 1:
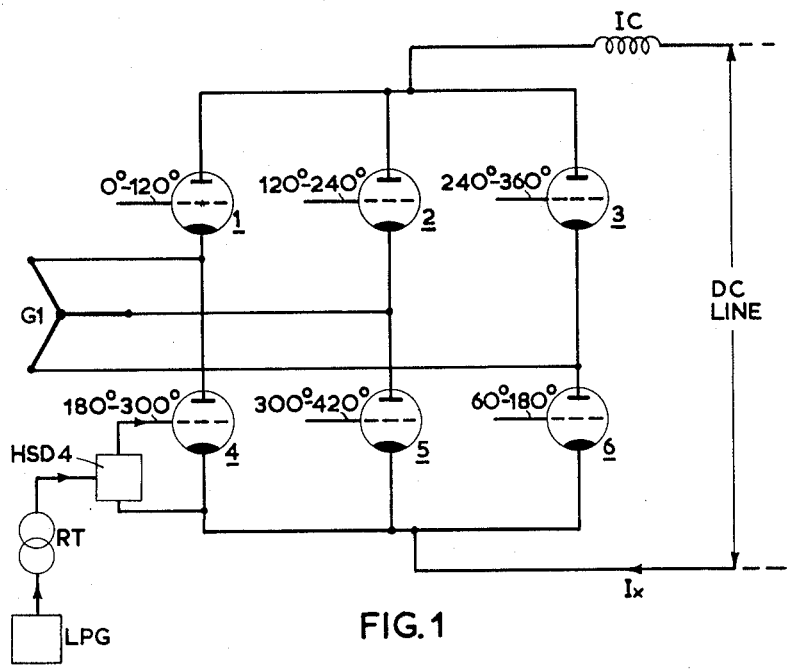
FIG. 1 shows schematically a bridge rectifier arrangement operable by 120° switching pulses, which are staggered in time in the manner indiacted to obviate switching difficulties.

Referring first to FIG. 1, a 3-phase A.C. generator G1 is connected via paralleled mercury valves 1, 2, 3 and 4, 5, 6 respectively to the positive and negative leads of a high voltage D.C. transmission line, including an induction coil IC.

Figure 2:
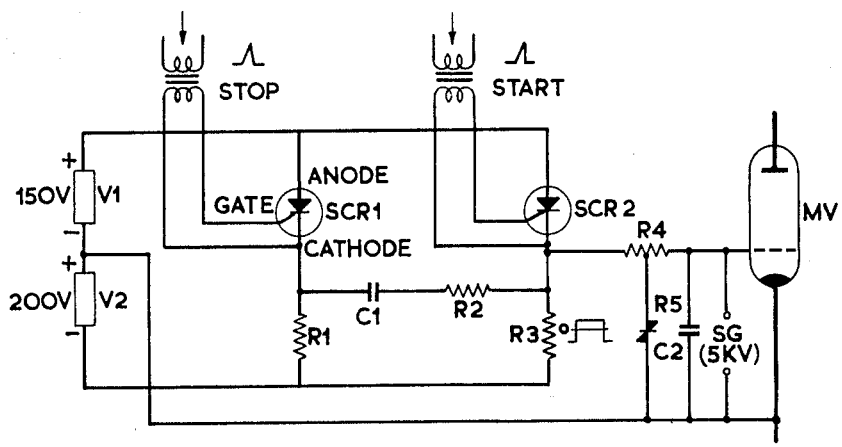
FIG. 2 shows the circuit of a grid pulse generator for H.V.D.C. switching purposes.

The valves 1–6 are controlled by respective switching devices of the type shown in FIG. 2, for instance, of which one is indicated at HSD. It is desirable to locate the switching device HSD, which switches at high voltage, adjacent to the switch controlled thereby. It is proposed therefore to locate HSD on the platform carrying the valve, e.g., 3, controlled thereby and to operate HSD at valve cathode potential, drawing power from a local auxiliary power source.

The main grid pulse generator HSD is triggered on and off by short ON and OFF pulses from a generator LPG, located at a distance, feeding the short pulses to a pulse transformer RT which in turn feeds operative pulses at working voltage to HSD.

The switching devices HSD are arranged to apply 120° pulses to the respective valves 1–6 at different positions in the three-phase generating cycle of G1. For instance, the devices controlling 1, 2 and 3 respectively apply pulses at relative phases expressed in electrical degrees of 0°–120°; 120°–240°; 240°–360°; while the devices controlling 4, 5 and 6 respectively apply pulses at 180°–300°; 300°–60°; and 60°–180°. The absolute phase of all the pulses relative to the generator G, may be shifted simultaneously by an equal amount via the low power control pulse generators LPG, to provide variation of the D.C. output voltage.

It will be appreciated that the pulses controlling 4, 5 and 6 overlap the pulses controlling 1, 2 and 3, and in consequence, simultaneous closure of two valves, one in each set, can occur, thus facilitating starting of the equipment, and stable operation at low currents.

By suitable control of the valves 1–6, the equipment can be made to operate as an inverter.

The bistable switching device HSD shown in FIG. 2 will now be described. The circuit utilizes dry semi-conductor three-electrode devices acting as grid-controlled diodes, for instance PNPN devices, but small grid-controlled mercury pool valves or the like having a somewhat similar behaviour may be used.

It is to be understood that the type of valve 1–6 used in the rectifier equipment conducts in response to a given minimum potential between cathode and grid, and maintain conduction between anode and cathode so long as anode current remains positive, irrespective of conditions on the grid. Such a valve therefore stops conducting when the anode current falls to zero.

The voltage sources V1 of 150 v. and V2 of 200 v. in series may be provided by a fixed potentiometer across a 350 v. supply.

The components R5, C2 and SG are for protection against over-voltage and will be initially ignored.

After switching on the two D.C. power supplies V1 and V2 of 150 v. and 200 v. respectively, both the silicon controlled diodes SCR1 and SCR2 remain non-conducting for the moment. Both their cathodes and also the grid of the main valve MV are at —V2 (say —200 v.), voltages being measured relative to main valve cathode.

If a "start" pulse is now delivered to the gate electrode of SCR2, this fires and becomes conducting with small voltage drop. Hence SCR 2 cathode rises to nearly V1 (say 150 v.). The main valve grid is driven positive and fires the main valve MV, this grid then remaining at typically 10 v.

If a "stop" pulse is now delivered, SCR 1 fires; its cathode rises suddenly to nearly 150 v. Via capacitor C1 this forcibly drives SCR2 cathode above its anode voltage, a small resistor R2 preventing excessive peak current. SCR2 cathode returns fairly rapidly, with time-constant approximately $R_3C_1$ (but rather faster in the initial stages) to —200 v, the grid of the main valve MV returning with it. The time during which SCR2 cathode is positive to its anode is arranged to be sufficient to extinguish its current (say 30μs.)

On the arrival of the next start pulse, SCR fires, extinguishing SCR1 by a similar process, and also turning on the main grid again.

The wave-forms involved are shown in FIG .7.

The two control pulses alternately turn the main grid pulse on and off; the times between pulses may be random or indifinitely long, so that effectively D.C. control of the main grid is available. Turn-on is rapid, but turn-off is effectively somewhat delayed; in a rectifier or inverter circuit the nominal "on" time would normally be 120° electrical (for a 3-phase system) and a small turn-off delay is acceptable, provided it does not exceed main circuit commutation time (this delay is shown exaggerated in the figure).

A slightly different performance is obtained on the first pulse after establishing power supplies, but this is unimportant.

Typical component values for devices used in FIG. 2 are $R_1$—1,000 ohms: $R_2$—2 ohms: $R_3$—500 ohms: $R_4$—60 ohms: $C_1$—1μf.: $C_2$—1 μf.

The circuit can alternatively use small mercury arc valves instead of silicon-controlled diodes; these behave in substantially the same way, except for their somewhat larger voltage drop in the conducting condition; they also require auxiliaries, such as excitation and grid bias.

Figure 6:
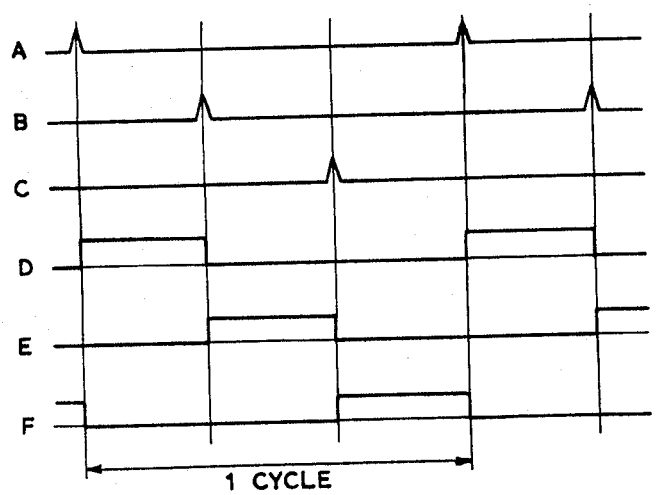
FIG. 6 shows the timing of the pulses at each stage of FIG. 5.

Thus HSD1, 2, 3 give outputs in turn each of 120° duration as indicated in FIG. 6.

Figure 3:
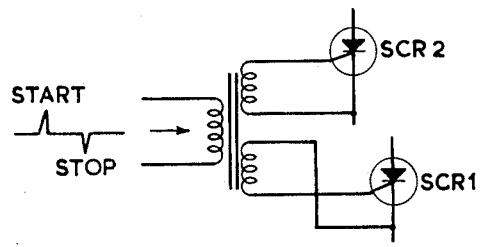
FIG. 3 shows a modification of FIG. 2.

The two control pulses may be comparatively short, say 10 μs. long. In a high voltage system, where main valve cathode may be at high voltage to earth, these pulses may be transmitted from earth level by pulse transformers with appropriate primary/secondary insulation. The cost of such short-pulse transformers is appreciably smaller than a corresponding transformer for full width (120° say) or full grid power.

Where transformer coupling is used, it is advantageous to use a common short-pulse transformer, FIG. 3, with two secondary windings connected to SCR1 and SCR2, respectively, the connections between SCR1 and its secondary being reversed. Then a "start" signal may be delivered as, say, a positive pulse on the common primary, firing SCR2 only, and a "stop" signal as a negative pulse, firing SCR1 only.

$R_6$ may be 10 kilohms, while the resistance of relay coil RL may be 10 kilohms.

An alternative method of transmitting the trigger signals from earth level is the use of modulated light beams. A photo-cell and small amplifier may be used at the receiving end, and (for example) a gaseous discharge tube as the light source, pulsed on by the control circuits at ground level. Two such channels are required, one for the "start" pulse and one for the "stop" pulse. Equipment of this type will be described below with reference to FIG. 9.

Figure 5:
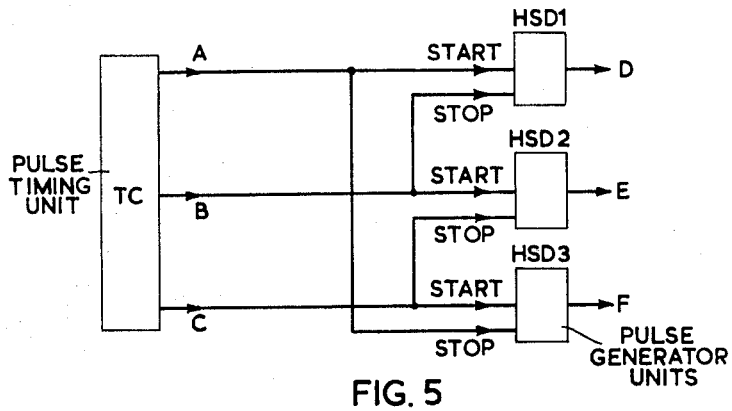
FIG. 5 illustrates a method of applying Start (ON) and Stop (OFF) pulses to three switching devices H.S.D. controlling a set of three valves feeding a D.C. transmission line from a 3-phase supply.

In FIG. 5, a timing circuit TC generates a cycle of three pulses A, B and C, FIG. 6, 120° apart, which control switching devices HSD1,2,3 for the valves 1,2,3, FIG. 1. The pulse A is applied to HSD1 as START and to HSD3 as STOP, and so on.

Normally (after this first pulse) there is always alternately one or other silicon-controlled diode, on, but never both.

However, it is possible for both diodes to turn on and stay on indefinitely, the "stop" pulse losing control. This can occur if one type of pulse follows the other after too small a time, not permitting sufficient exponential recovery of the appropriate cathode.

This does not cause damage, but it is the equivalent of sustained fire-through on the main valve MV.

Figure 4:
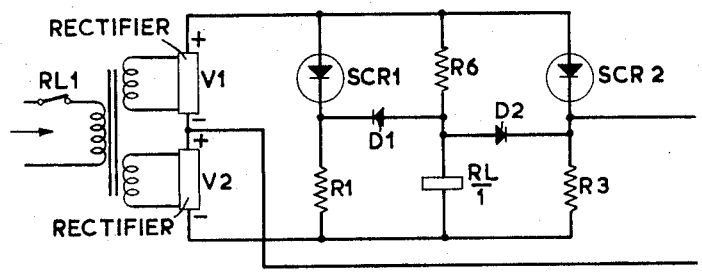
FIG. 4 shows an alternative arrangement of the circuit of FIG. 1 for giving protection against stalling.

A suitable method of automatically detecting and removing this fault is shown in FIG. 4. Diodes D1, D2, resistor R6, and relay RL are added to the original circuit (shown incomplete). Relay RL adopts a voltage corresponding to the lowest of the two cathode voltages at every instant. Normally this voltage is substantially zero, except for brief positive excursions during the exponential recoveries, and its mean value is insufficient to operate RL, which is slugged sufficiently to ignore the ripple in its voltage. On a fault occurring, both SCR1 and SCR2 conduct, and RL operates.

The relay contact RL1 (or contacts) is arranged to interrupt both power supplies (shown in the figure as A.C. supply with rectifiers), thus extinguishing both SCR1 and SCR2. Relay RL then releases and the circuit reverts to normal operation.

In practice, if the pulse control source is suitably designed, too close a pulse spacing can be prevented, and it is very difficult for anything else to cause this fault; however, this protection circuit is justified because of the relative inaccessibility of the pulse generator in a high voltage system.

In a high voltage circuit, under certain fault conditions (e.g., excitation failure) main circuit current or voltage may try to appear at the main valve grid, and destroy the grid pulsing circuits.

Protection may be added against this by a spark gap, SG, FIG. 2, connected between main grid and cathode, set to, say, 5 kv., and a non-linear (e.g. silicon-carbide) resistor, R5, connected from a tapping on R4 to cathode. Main grid voltage (to cathode) then cannot exceed 5 kv., and at this voltage sufficient attenuation is presented by the resistor R5 shunting the path to the grid pulse generator, to avoid damage to the latter (a maximum of 400 v. across R5 would be typical).

The resistor R5 is designed to have much higher resistance at the ordinary working voltages so that it does not greatly affect normal operation; nevertheless, for adequate protection, some attenuation of normal grid power and bias must be accepted.

In practice, the circuit shown is not the optimum; it is preferable to remove the upper end of R3 to the tap on R4; with suitable values, and for given grid current and bias voltage, this gives lower currents in SCR2 and power supplies.

A capacitor, C2, may be added directly from main grid to cathode; this provides protection against spurious grid pulses appearing via stray capacitance from main valve anode (e.g. from sudden voltage changes due to other valves firing). Since this pulse generator can operate at exceptionally low inpedance (e.g. 200 v. 1A.) the value of C2 can be considerable (e.g. 1 μf.) without excessive firing delay.

Figure 8:
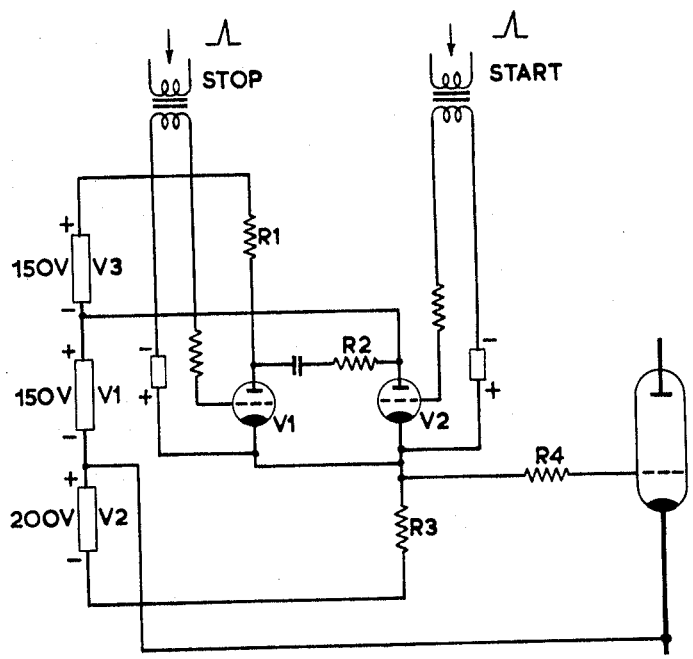
Figure 7:
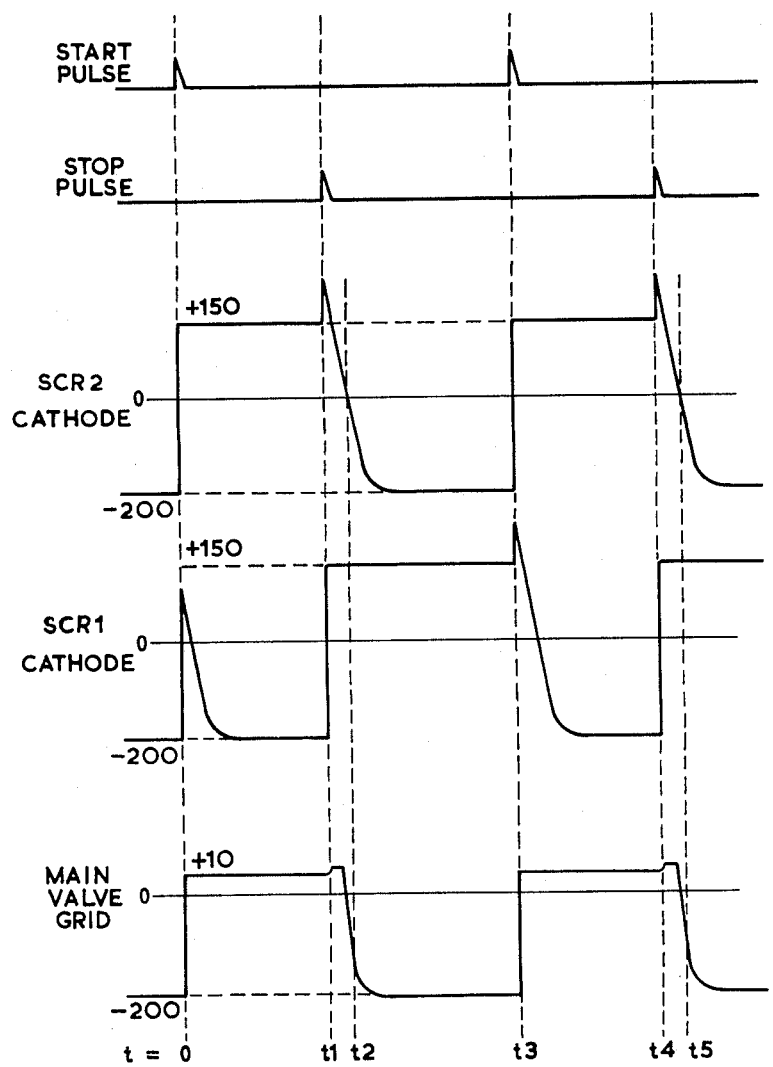
FIG. 7 shows the waveforms for FIG. 2.

Although small mercury arc valves can be used to replace the silicon-controlled diodes in FIG. 2, it is then preferable to use the circuit of FIG. 8. This has the advantage of a common cathode connection between the two small valves, so that a common tank can be used, with common excitation and bias. The circuit requires an extra D.C. power supply, V3, of comparatively low current.

The operation is generally similar to the previous circuit, though some of the waveforms are reversed and of different D.C. level.

The following typical component values may be used in FIG. 8: $R_1$ equals 2,000 ohms: $R_2$ equals 1 ohm: $R_3$ equals 500 ohms: $R_4$ equals 60 ohms: C equals 1 μf.

Valves V1, V2 in FIG. 8 could be shown in a common tank, sharing a common cathode if preferred; the use of separate valves is possible, though not probable.

Over-voltage protection can be applied as before, but not the stall protection of FIG. 4.

Mercury valves have the disadvantage compared with silicon-controlled diodes that to extinguish them the cathodes must be driven up by at least 20 v. relative to anode instead of at least 1 v., and due to both this and the longer de-ionising time, the exponential recoveries must be longer: C1, FIG. 2, must be larger.

As stated in regard to FIG. 2, only one D.C. supply may be used, the tapping on the original supply being obtained as a tapping on a resistor connected across the supply. It is then possible to use, for instance, a single D.C. generator as source. However, this method has the disadvantage of inevitably attenuating the grid driving and bias voltages obtained; also it draws a considerable extra bleed current from the power supply.

If all the pulses in a rectifier group are generated as short pulses (at low power level), then these can comprise the "start" pulses for the various main grid pulse generator HSD1-3, FIG. 5, connected in the required sequence. Each short pulse can also be routed to the "stop" pulse input for the previous channel. Hence, for example, for a 3-phase group the resulting grid pulse will be one-third of a cycle (120°) wide, i.e. a standard "broad" pulse.

In a 3-phase bridge system, this is divided into two 3-phase start groups, each requiring 120° pulses. In a 6-phase double star system, this is again two 3-phase groups. In general, the nominal pulse width in a broad pulse system is the same as the corresponding valve conduction time, ignoring commutation time.

The desired short pulses may be obtained, for instance, by quasi-differentiating the output of a magnetic amplifier, or the outputs of circuits as described in British patent specification No. 876/54.

Figure 9:
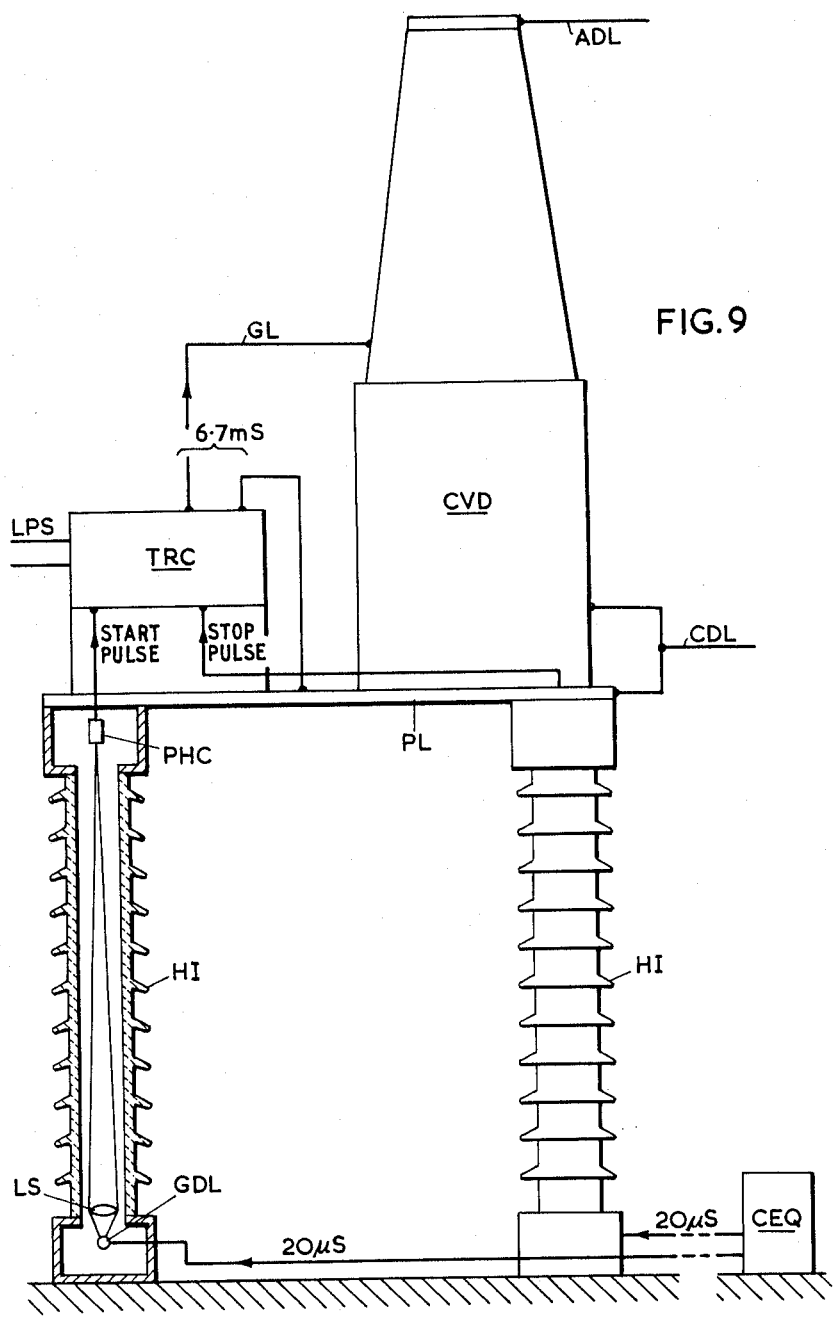
FIG. 9 shows how the various units of a complete convector equipment are mounted and electrically interconnected.

FIG. 9 shows diagrammatically how equipment using modulated light-beam pulse transmission is mounted and safeguarded.

A platform PL is mounted on hollow insulating legs or columns HI. On the platform is mounted the converter device, in this case a mercury-arc valve, provided with anode and cathode leads ADL, CDL, and a grid lead GL from the trigger circuit TRC, or grid pulse generator, which is also mounted on platform PL. The circuit TRC has a local power supply LPS via a transformer, having a voltage to suit the devices therein.

Control equipment CEQ, comprises a pulse source which is connected to gas discharge lamps, such as GDL, mounted within the bases of the two legs HI. The upper ends of the two legs contain photo-electric cells such as PHC and the light from GDL is focussed on PHC by a lens LS mounted within each leg. Start and Stop pulse leads from CEQ are connected to the circuits of corresponding lamps GDL, one in each leg, so that the lamp beams are respectively modulated by start and stop pulses to influence their corresponding cells PHC. The cells PHC are arranged to retransmit the pulses received thereby to the trigger circuit TRC.

It will be seen that all dangerous equipment is mounted on the highly-insulated platform PL, the only easily-accessible equipment being the lower-power grounded pulse equipment.

In the mercury-arc equipment, each "valve" may be a multi-arc device, with individual anodes and grids with a common cathode, the whole sharing a common tank.

Cathode, grid, and grid pulsing circuits are always within a few hundred volts of each other but may be at high voltage to earth.

It is to be understood that a rectifier is a converter operating with firing angles of about 0° ... 90°, whereas an inverter is a converter operating with firing angles of about 90° ... 170°.

Converters controlled in the manner described above may use silicon, or other semi-conductor, controlled or gated diodes, as the main elements in place of mercury arc valves.

The control technique may be applied to single biphase and to single-phase bridge converter equipment, which are essentially 2-phase, since they have A.C. vectors at 360/2 eqauls 180°. The grid pulse length required is then 180° instead of 120°.

I claim:

1. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current system, which pulse source is mounted separately from said converter equipment proper, and protective coupling means interconnecting said pulse source and said individual triggered bistable circuits, each said individual trigger circuit being mounted closely adjacent to its respective device, at approixmately its cathode potential, both being insulated for high voltage, and drawing its necessary auxiliary power from a low-voltage supply available at approximately valve cathode potential, wherein the source of low power pulses is separately mounted, and wherein said insulated coupling means comprise two control pulse channels associated with each trigger circuit, respectively to deliver start and stop control pulses.

2. Polyphase electrical converter equipment comprising a plurality of grid-controlled devices for coupling high-voltage direct current transmission lines to an alternating current power system, means for turning each said device ON and means for turning each said device OFF, a triggered bistable circuit individual to each device which comprises means for turning said circuit ON and means for turning said circuit OFF and which is mounted closely adjacent the respective device, an ON output from said circuit connected to said means for turning the respective device ON and an OFF output from said circuit connected to said means for turning the respective device OFF, a source of low-power electrical control pulses comprising timing means and means for generating a repetitive cycle of time-speed trigger pulses, transmission channels between pulse outputs from said source and Start and Stop inputs to said trigger circuits to supply start and stop trigger pulses to said triggered bistable circuits having a fixed spacing in time and being cyclically repeated at fixed time intervals for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits.

3. Equipment as claimed in claim 2, wherein each said individual trigger circuit comprises a pair of semiconductor controlled or gated diodes which act as the on-off devices, and only one of which is ON at a time.

4. Equipment as claimed in claim 2, wherein each said individual trigger circuit comprises a pair of mercury-discharge trigger devices which act as the on-off devices, and only one of which is ON at a time.

5. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, separate start and stop pulse transformers being associated with each trigger circuit.

6. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, a single transformer with two relatively-reversed secondary windings being associated with each trigger circuit to feed both start and stop pulses to the corresponding trigger circuit.

7. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, the source of control pulses being a low-power source at approximately earth potential, while said insulated coupling means are arranged to apply pulses to said trigger circuits and to isolate the low voltage and high voltage equipments from each other.

8. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, said insulated coupling means comprising pulsed light-beam transmitting and receiving devices.

9. Equipment as claimed in claim 8 wherein said pulsed light beam transmitting device comprises a gaseous discharge tube and a low-power pulse source at approximately earth potential, and wherein said pulsed light beam receiving device comprises a photo-electric cell.

10. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, each trigger circuit including means for detecting simultaneous ON conditions of its two trigger devices, and for automatically putting the associated rectifier out of action.

11. Equipment as claimed in claim 10 wherein said detecting means are arranged to put the rectifier out of action by temporarily switching off the auxiliary power supply to the trigger device.

12. Equipment as claimed in claim 4 wherein the trigger devices of each trigger circuit are small mercury arc triodes with a common cathode and sharing a common tank.

13. Equipment as claimed in claim 2, wherein said power devices with their respective trigger circuits are mounted on a platform carried on hollow insulating pillars, accommodating pulse transmission channels.

14. Equipment as claimed in claim 13 wherein said insulated coupling means comprise pulse transformers mounted on said platform.

15. Equipment as claimed in claim 13 wherein said insulated coupling means comprises pulsed light beam transmitting and receiving devices, arranged for light beam transmission through a hollow pillar.

16. Polyphase electrical converter equipment comprising a plurality of grid-controlled devices for coupling high-voltage direct current transmission lines to an alternating current power system, a triggered bistable circuit individual to each device which is mounted closely adjacent the respective device and which is arranged to respond to start and stop pulses and in response thereto to transmit control pulses to the respective device having a time width determined by the start and stop pulses and equal to the nominal conducting time of the device ignoring commutation time, a source of low-power electrical control pulses arranged to transmit start and stop trigger pulses to said triggered bistable circuits for controlling the operation of said triggered bistable circuits in the required time cycle to control the power flow between alternating current and direct current systems, which pulse source is mounted separately from said converter equipment proper, and protective coupling means interconnecting said pulse source and said individual triggered bistable circuits, each said individual trigger circuit being mounted closely adjacent to its respective device, at approximately its cathode potential, both being insulated for high voltage, and drawing its necessary auxiliary power from a low-voltage supply available at approximately valve cathode potential, wherein the source of low power pulses is separately mounted, and wherein said protecting coupling means comprise two control pulse channels associated with each trigger circuit, respectively to deliver start and stop control pulses.

17. Equipment as claimed in claim 2 wherein said grid-controlled devices are grid-controlled mercury arc rectifiers.

References Cited by the Examiner

UNITED STATES PATENTS

| | | | |
|---|---|---|---|
| 2,362,652 | 11/1944 | Lundborg | 321—38 |
| 2,790,088 | 4/1957 | Shive | 250—213 |
| 2,859,399 | 11/1958 | Sommeria | 321—38 |
| 2,989,676 | 6/1961 | Fischer | 321—38 X |
| 3,071,720 | 1/1963 | Geissing | 321—40 |

FOREIGN PATENTS

| | | |
|---|---|---|
| 1,218,252 | 12/1959 | France. |
| 910,925 | 5/1954 | Germany. |
| 870,407 | 3/1959 | Great Britain. |

LLOYD McCOLLUM, *Primary Examiner.*

SAMUEL BERNSTEIN, *Examiner.*